United States Patent
Vormfenne

(10) Patent No.: US 6,382,282 B1
(45) Date of Patent: May 7, 2002

(54) VEHICLE TIRE HAVING CURVED GROOVES ALWAYS OPEN SUBSTANTIALLY PERPENDICULARLY INTO FRONT BOUNDARY LINE OF CONTACT PATCH

(75) Inventor: Jörg Vormfenne, Rodenbach (DE)

(73) Assignee: Dunlop GmbH, Hanau (DE)

( * ) Notice: Subject to any disclaimer, the term of this patent is extended or adjusted under 35 U.S.C. 154(b) by 0 days.

(21) Appl. No.: 09/436,218

(22) Filed: Nov. 9, 1999

(30) Foreign Application Priority Data

Nov. 9, 1998 (DE) .......................................... 198 51 594

(51) Int. Cl.$^7$ ...................... B60C 11/03; B60C 103/04; B60C 115/00
(52) U.S. Cl. ............................. 152/209.18; 152/209.28
(58) Field of Search ......................... 152/209.18, 209.28

(56) References Cited

U.S. PATENT DOCUMENTS

| | | | | |
|---|---|---|---|---|
| 4,057,089 A | * | 11/1977 | Johannsen | 152/209.28 |
| 4,832,099 A | * | 5/1989 | Matsumoto | 152/209.28 |
| 5,054,530 A | * | 10/1991 | Shiraishi | 152/209.28 |
| 5,105,864 A | * | 4/1992 | Watanabe et al. | 152/209.18 |
| 6,109,317 A | * | 8/2000 | Iwamura et al. | 152/209.28 |

FOREIGN PATENT DOCUMENTS

| | | | | |
|---|---|---|---|---|
| EP | 688685 | * | 12/1995 | 152/209.28 |
| EP | 718123 | * | 6/1996 | 152/209.28 |
| JP | 4-126610 | * | 4/1992 | 152/209.28 |

* cited by examiner

Primary Examiner—Steven D. Maki
(74) Attorney, Agent, or Firm—Birch, Stewart, Kolasch & Birch, LLP

(57) ABSTRACT

A vehicle tire comprising a tread in which tread grooves (2, 4, 5, 6) are molded, wherein tread grooves (2) are provided for the improvement of the leading away of water and are curved in such a way that during the rolling of the tire, they always open at least substantially perpendicularly into the front boundary line (1) of the tire contact patch.

15 Claims, 3 Drawing Sheets

Figure 1:
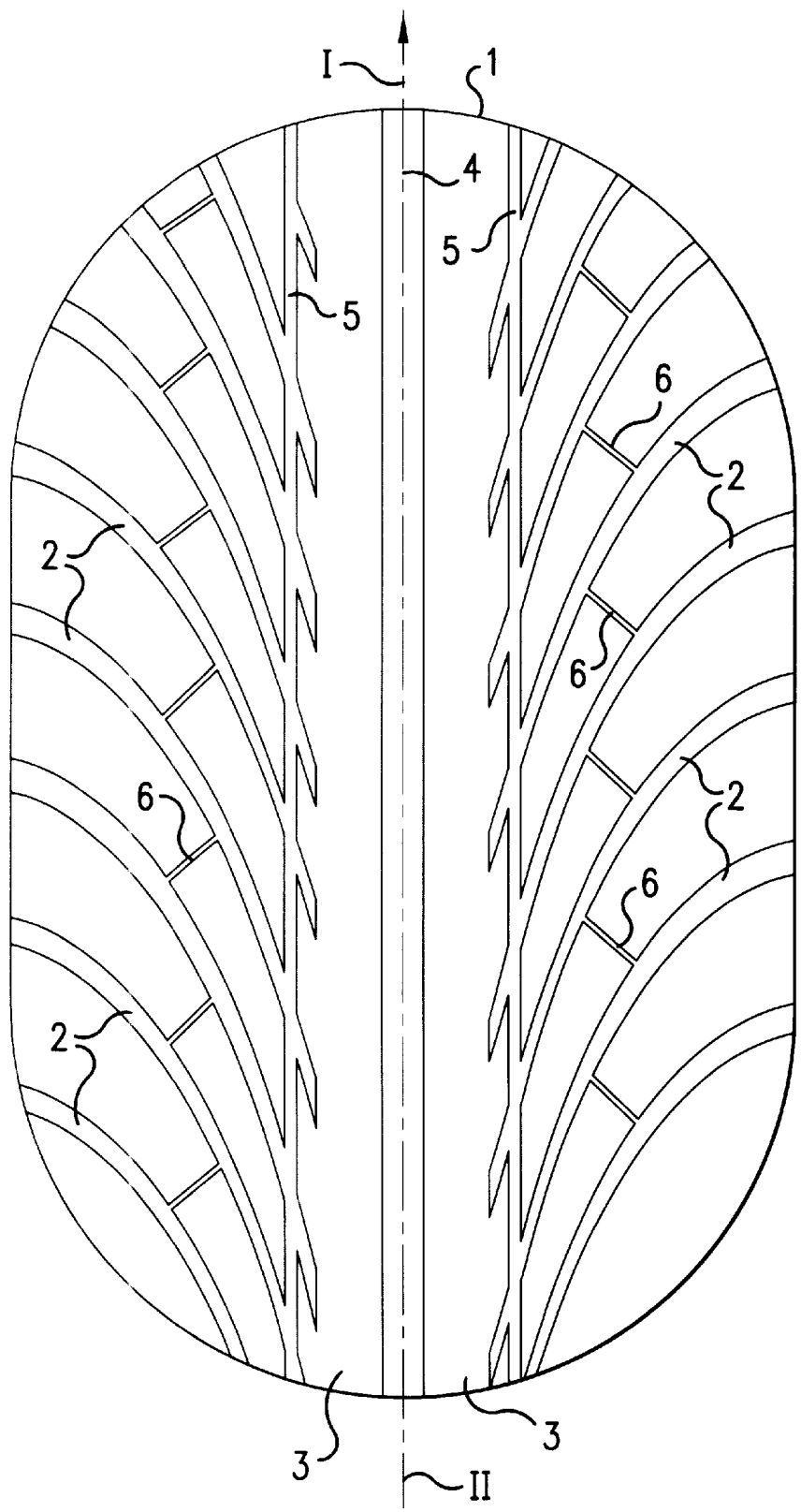

VEHICLE TIRE HAVING CURVED GROOVES ALWAYS OPEN SUBSTANTIALLY PERPENDICULARLY INTO FRONT BOUNDARY LINE OF CONTACT PATCH

The present invention relates to a vehicle tire comprising a tread in which tread grooves are molded.

The profiling of vehicle tires serves to ensure the adhesion of that tire also with a non-dry and non-solid surface. With a wet road, the water must be led away through the tread grooves of the vehicle tire in order to ensure the contact to the road. Despite this, it has not been possible up to the present day to prevent a situation in which the vehicle tire starts to swim or float on the water present on the road above a certain vehicle speed and so-called aquaplaning arises.

The invention is based on the object of improving a vehicle tire of the initially named kind in this respect. In particular the leading away of water should be improved and a floating of the vehicle tire even at higher speeds is to be avoided.

This object is satisfied in that the tread grooves are curved in such a way that during the rolling of the tire, they always open at least substantially perpendicularly into the front boundary line of the tire contact patch.

Through this design the path which a water particle has to traverse in order to move out of the tire contact patch is reduced to a minimum. Through the short path not only is the time for the leading away of the water particles minimized, but rather the water particles are also transported relatively far from the tire contact patch, whereby the leading away of water is particularly effective. At the same time the tread grooves of the invention result in the sound emission being minimized. Since the tread grooves of the invention open substantially perpendicularly into the front boundary line of the tire contact patch, a simultaneous striking action of a longer tread edge on running into the tire contact patch does not arise, whereby a minimum noise emission is achieved.

The front boundary line of the tire contact patch is in this arrangement defined as that line which is characterized in that all rubber particles which lie on this line simultaneously contact the road surface during rolling of the tire. Extremely unfavorable with respect to the noise emission would be a tread groove which extends parallel to the front boundary line, because in this case the edges of the tread simultaneously strike the road surface. This is avoided by the tread design of the invention.

In accordance with a further aspect of the invention, the opening angle of the curved tread grooves which angle is substantially 90° is related to the shape of the contact patch in a particular state of travel, in particular at a speed of travel when there is danger of aquaplaning. It is known that the shape of the tread contact patch changes with increasing vehicle speed. On the other hand, it is known that the danger of aquaplaning starts approximately at a speed of 80 to 100 km/h. By the matching of the tread design to the shape of the tire contact patch at a higher vehicle speed, a situation is achieved in which the leading away of water is ideal, in particular in a critical driving condition, in that a perpendicular opening of the curved tread grooves into the front boundary line of the tire contact patch is present with the then given shape of the tire contact patch.

In accordance with a further aspect of the invention the curved tread grooves end axially inwardly at a distance from the center of the tread. In particular the curved tread grooves end axially inwardly in a tread rib or tread groove extending around the tire in the circumferential direction. In this way a stable tread design is achieved.

In accordance with a further aspect of the invention a tread groove extending in the circumferential direction is provided at the center of the tread. Perpendicular opening into the boundary line of the tire contact patch signifies an orientation in the circumferential direction of the tire at the center of the tread. A corresponding encircling or circumferentially extending groove at the center of the tread is thus particularly suited for the leading away of water.

In accordance with a further aspect of the invention at least one further tread groove extending around the tire in the circumferential direction is provided, which preferably crosses the curved tread grooves. These further tread grooves lead to an improved structuring of the tread pattern.

In accordance with a further aspect of the invention additional further tread grooves are additionally provided, in particular tread grooves extending transversely to the curved tread grooves. Two adjacent tread grooves are in each case preferably connected to one another via at least one transverse groove. These designs also serve for improved structuring of the tread pattern.

Figure 2:
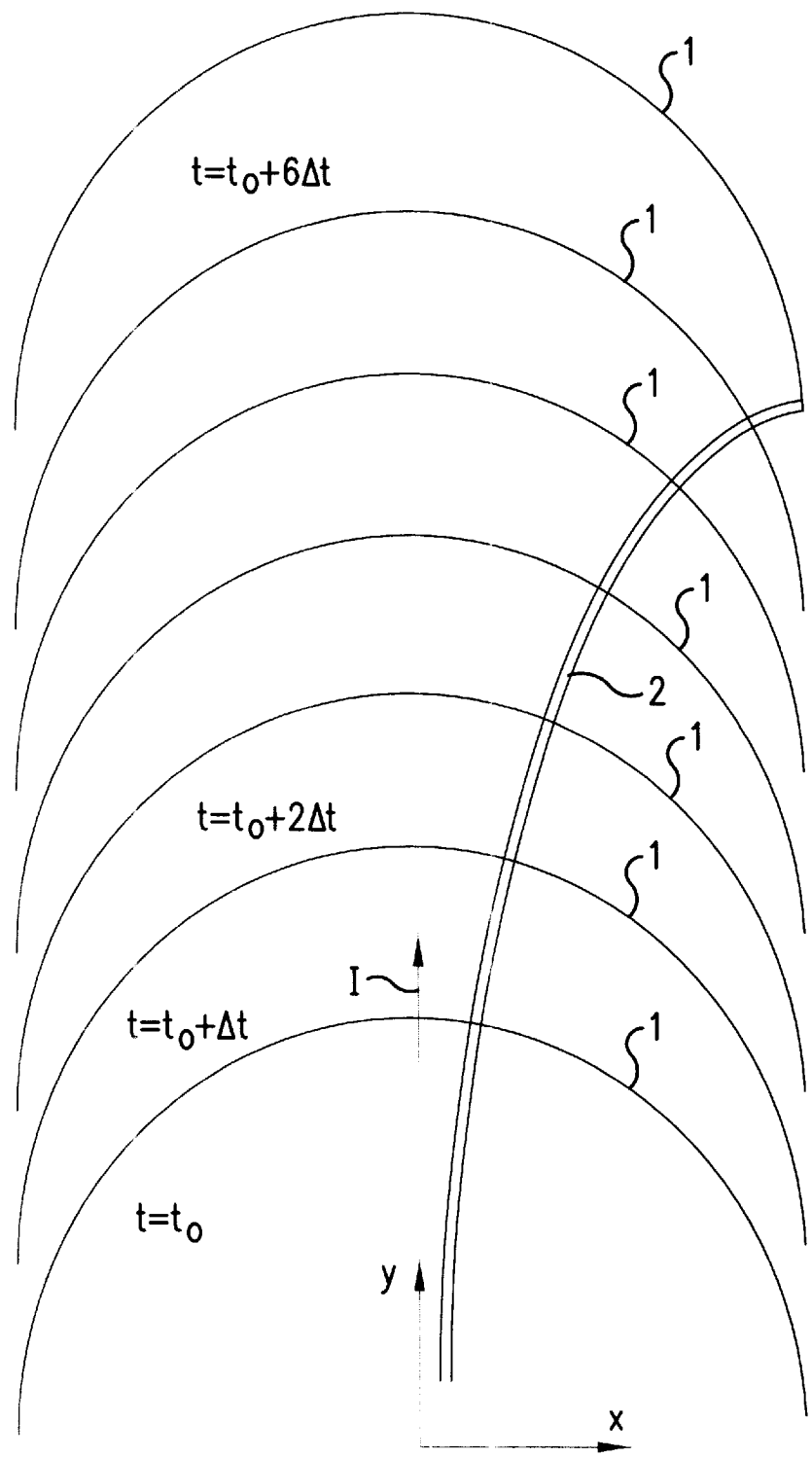
Figure 3:
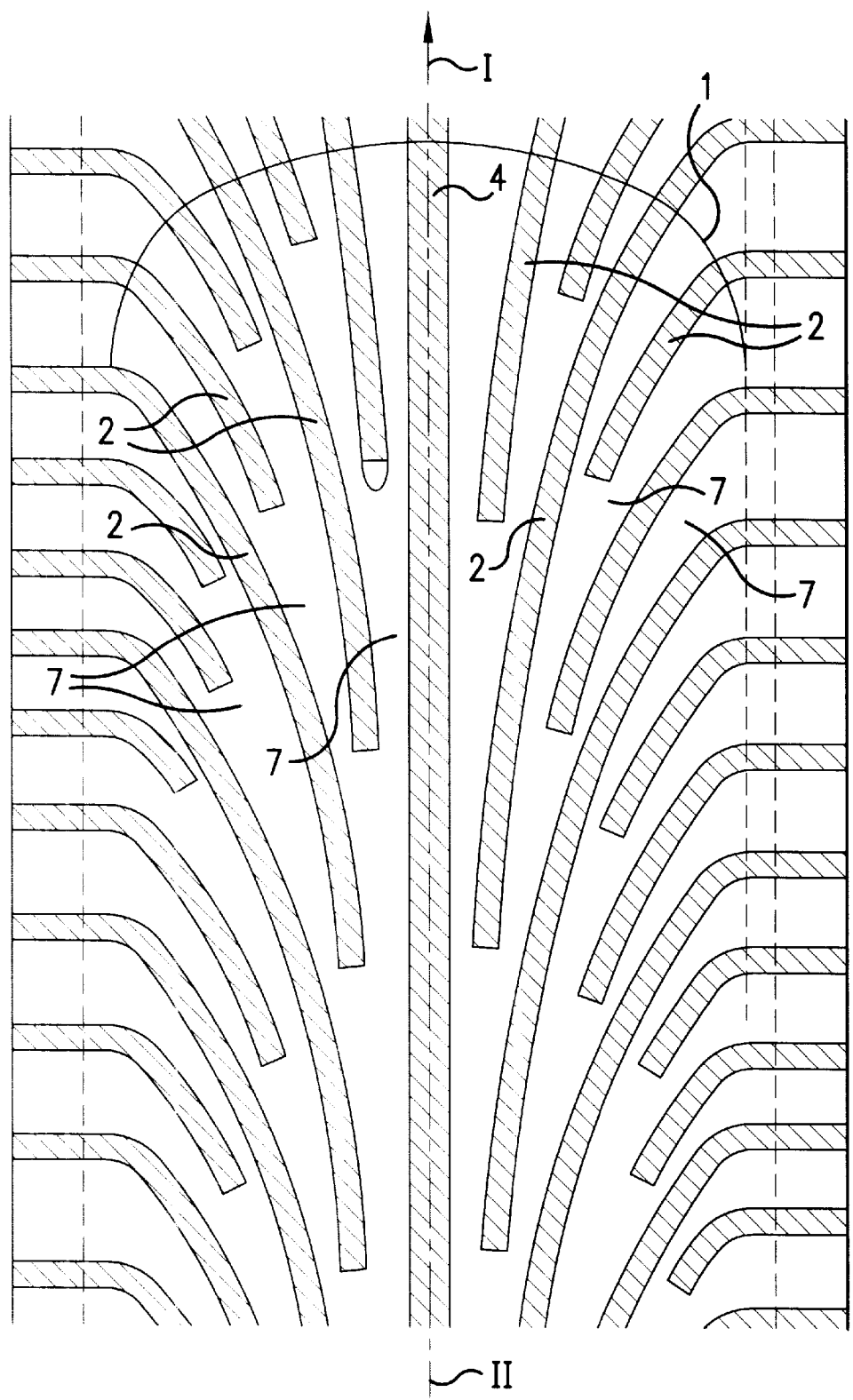

An embodiment of the invention is shown in the drawings and will be described by way of example only, below. There are shown, in each case in a schematic representation:

FIG. 1 a plan view of the tire contact patch of a vehicle tire in accordance with the invention;

FIG. 2 the development (unwinding) of a curved tread groove in accordance with the invention as a function of time; and FIG. 3 a plan view of a tread section of a variant of the vehicle tire of the invention.

The tire contact patch shown in FIG. 1 is shown, greatly simplified, as an oval. The rolling direction is shown by the arrow I. Accordingly, the front boundary line 1 is located at the top of the tire contact patch in the drawing.

The tread of the vehicle tire of the invention includes tread grooves 2, which extend arcuately forwardly and outwardly in the middle tread region from an encircling or circumferentially extending tread rib 3 in each case. The curvature of the tread grooves 2 is so shaped in this arrangement that the tread grooves 2 always open at least approximately perpendicularly into the front boundary line of the tire contact patch. The curvature of the curved tread grooves 2 will thus be determined in the case of an oval tire contact patch in accordance with the following formula:

$$y = \sqrt{r^2 - x^2} - r \cdot \ln\frac{r + \sqrt{r^2 - x^2}}{x},$$

wherein r is the radius of the front boundary line of the tire contact patch.

This formula is naturally to be adapted to the actual shape of the tire contact patch.

A circumferentially extending groove 4 is provided at the center of the tread, which, as one can see, likewise opens perpendicularly into the front boundary line 1 of the tire contact patch. The encircling tread groove 4 is bounded on both sides by the two circumferentially extending tread ribs 3. The two tread ribs 3 are in turn bounded by two further encircling tread grooves 5 in the circumferential direction of the tire, which cross with the curved tread grooves 2. In addition, transverse grooves 6 are provided which respectively connect two of the curved tread grooves 2 to one another.

The development of a curved tread groove 2, i.e. its opening into the tire contact patch during rolling of the tire can be recognized with respect to FIG. 2. The front boundary line 1 of the tire contact patch is shown here from the bottom to the top at times which follow one another at the same interval. The development of the curved tread groove 2 shows that this always opens perpendicular into the front boundary line 1 of the tire contact patch. A water particle is thus always transported away from the tire contact patch by the shortest route. The transport thereby takes place quickly and far.

The additional grooves 4, 5 and 6 in FIG. 1 bring about a better structuring of the tire tread. On the whole one obtains a vehicle tire with an optimized dissipation of water. In order to ensure this, in particular in critical vehicle conditions, the curvature of the curved tread grooves 2 is determined in dependence on the shape of the tire contact patch at higher vehicle speed, for example at 80 to 100 km/h. The so designed vehicle tire has, moreover, a low noise development since no tread edges are present extending parallel to the front boundary line 1 of the tire contact patch, which, on entry into the tire contact patch, simultaneously strike on the road, which would lead to a higher noise emission.

In the variant of a tread pattern in accordance with the invention shown in FIG. 3, arcuately extending tread grooves 2 are likewise present, the curvature of which is so designed that the tread grooves 2 always open at least approximately perpendicularly into the front boundary line 1 of the tire contact patch. Tread blocks 7 are present between the tread grooves 2, which are separated from one another by a central tread groove 4, which are in other respects, however, connected together on both sides of the mid-circumferential plane 2.

As one can see, the variant of the tread pattern of the invention shown in FIG. 3, has no further encircling tread grooves and no transverse grooves 6 in distinction to the variant shown in FIG. 1. Moreover, the tread pattern of the invention can also be formed without the central tread groove 4. Nevertheless, the above described advantageous characteristics of the tread pattern of the invention result.

What is claimed is:

1. A vehicle tire comprising a tread in which tread grooves (2, 4, 5, 6) are molded, wherein the tread grooves (2) are curved in such a way that during rolling of the tire, there is reduced noise emission and they always open substantially perpendicularly into the front boundary line (1) of the tire contact patch, and wherein the curved tread grooves (2) end axially inwardly at a distance from the center of the tread.

2. A vehicle tire in accordance with claim 1, wherein the curved tread grooves (2) end axially inwardly in a tread rib (3) extending in the circumferential direction (I) of the tire.

3. A vehicle tire in accordance with claim 1, wherein a tread groove (4) extending around the tire in the circumferential direction (I) of the tire is provided at the center of the tread.

4. A vehicle tire in accordance with claim 1, wherein a tread groove (5) extending around the tire in the circumferential direction (I) is provided in parallel to tread groove (4) adjacent to the center of the tread.

5. A vehicle tire in accordance with claim 4, wherein at least one further tread groove (5) extending around the tire in the circumferential direction (I) is provided which crosses the curved tread grooves (2).

6. A vehicle tire in accordance with claim 1, wherein additional further tread grooves (6) are provided, which extend transversely to the curved tread grooves (2).

7. A vehicle tire in accordance with claim 6, wherein in each case two adjacent curved tread grooves (2) are connected to one another via at least one transverse groove (6).

8. A vehicle tire comprising a tread in which tread grooves (2, 4, 5, 6) are molded, wherein tread grooves (2) are curved with an opening angle in such a way that during rolling of the tire, there is reduced noise emission and the grooves (2) always open substantially perpendicularly into the front boundary line (1) of the tire contact patch and the opening angle of the curved tread grooves (2) is defined by the shape of the contact patch in accordance with the following formula:

$$y = \sqrt{r^2 - x^2} - r \cdot \ln \frac{r + \sqrt{r^2 - x^2}}{x}$$

where r=radius of the front boundary line of the tire contact patch, ln signifies the "natural logarithm", and y and x are the ordinate and abscissa, respectively, of a plane Cartesion graphic picture of the shape of the contact patch, and wherein the curved tread grooves (2) end axially inwardly at a distance from the center of the tread.

9. A vehicle tire in accordance with claim 8, wherein the curved tread grooves (2) end axially inwardly at a distance from the centre of the tread.

10. A vehicle tire in accordance with claim 8, wherein the curved tread grooves (2) end axially inwardly in a tread rib (3) extending in the circumferential direction (I) of the tyre.

11. A vehicle tire in accordance with claim 8, wherein a tread groove (4) extending around the tire in the circumferential direction (I) of the tire is provided at the center of the tread.

12. A vehicle tire in accordance with claim 8, wherein a tread groove (5) extending around the tire in the circumferential direction (I) is provided in parallel to tread groove (4) adjacent to the centre of the tread.

13. A vehicle tire in accordance with claim 12, wherein at least one further tread groove (5) extending around the tire in the circumferential direction (I) is provided which crosses the curved tread grooves (2).

14. A vehicle tire in accordance with claim 8, wherein additional further tread grooves (6) are provided, which extend transversely to the curved tread grooves (2).

15. A vehicle tire in accordance with claim 14, wherein in each case two adjacent curved tread grooves (2) are connected to one another via at least one transverse groove (6).

* * * * *